Nov. 3, 1959

E. D. HODGE 2,910,892

SHAFT POSITIONING DEVICE

Filed Aug. 20, 1953

INVENTOR.
EVERETT D. HODGE
BY
Alfred E. Miller
ATTORNEY 2,910,892

SHAFT POSITIONING DEVICE

Everett D. Hodge, Greenwich, Conn., assignor to Electomic Mechanisms Inc., Greenwich, Conn.

Application August 20, 1953, Serial No. 375,500

5 Claims. (Cl. 74—766)

The present invention relates to a shaft positioning device and more particularly to a shaft positioning device employing a clutch of the magnetic fluid type.

It is an object of the present invention to provide a shaft positioning device employing commercial, standard stock gears which may alternately change the direction of rotation of an output shaft, said shaft positioning device having zero back lash and proportional control of the output shaft.

Further advantages of the present device are as follows: a minimum of weight and size, thus the present shaft positioning mechanism lends itself to miniaturization. The present device does not utilize slip rings or wiping contacts. It is relatively free from "hunting" and "overshooting."

It is another object of the present invention to provide a shaft positioning mechanism which is capable of being controlled from a small sensing voltage and consumes a minimum amount of power for operation yet develops sufficient torque to make its use practical.

Still another object is to provide a highly sensitive shaft positioner which develops a large torque to inertia ratio yet is inexpensive to manufacture.

Still further advantages of the present invention are the use of a damping winding for high gain systems and the prevention of packing of magnetizable iron particles due to the low operating speed of the shaft positioning device.

It should be noted that the choice of gear ratios gives a variety of output shaft characteristics. Furthermore, additional clutches may be added or extra sets of ring, planetary and sun gears may be incorporated in the shaft positioner assembly in order to increase the output torque.

These and other features, objects and advantages of the present invention will become apparent from the following description considered in connection with the accompanying illustrative drawings.

Figure 1:
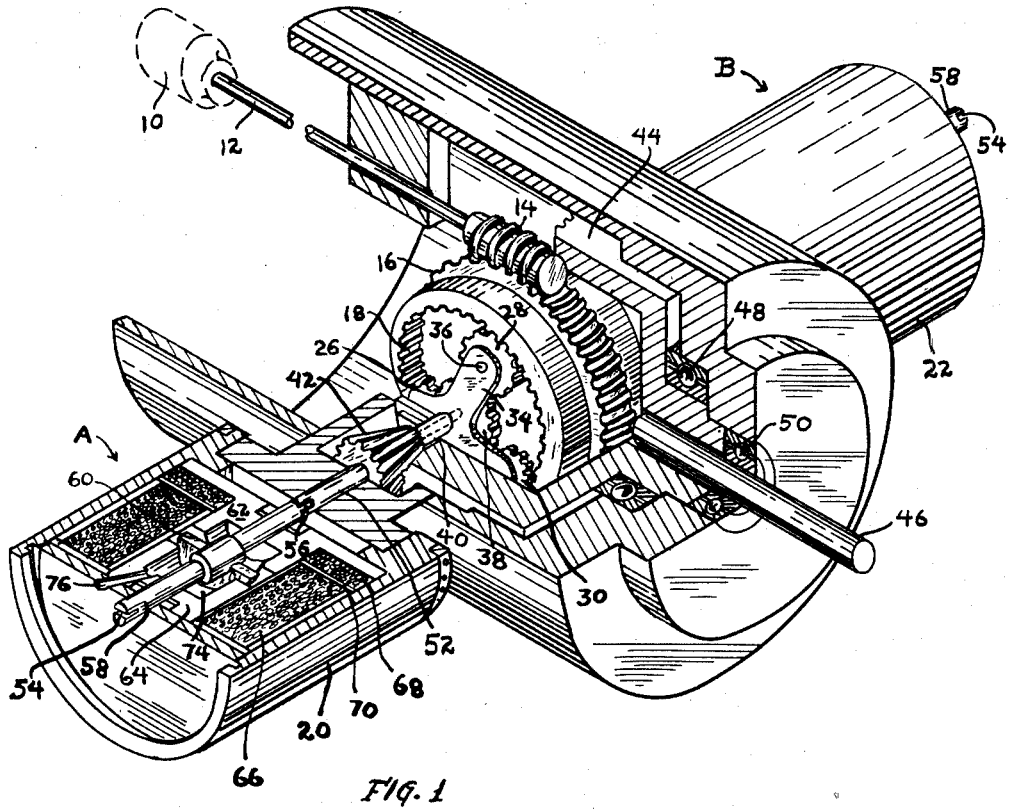
Fig. 1 is a perspective view with the housing partially cut away to illustrate the magnetic fluid clutch embodying the present invention.
Figure 2:
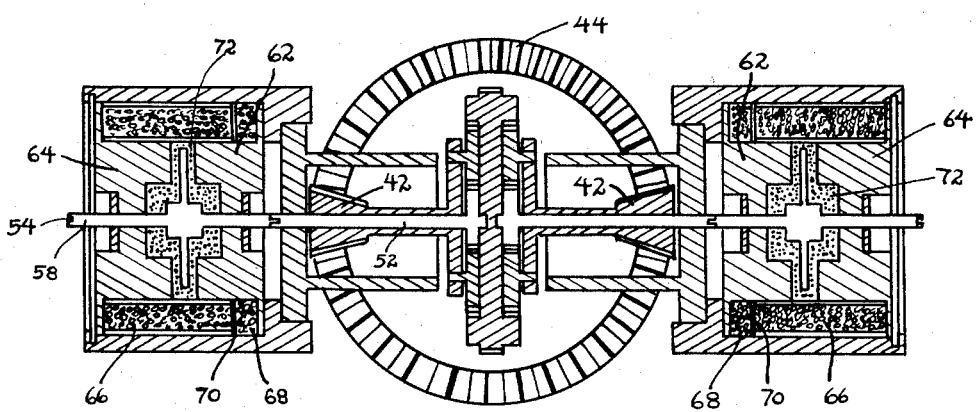
Fig. 2 is a vertical sectional view thereof.

Referring to the drawings in particular, the shaft positioning device embodying the present invention is coupled to a motor 10 shown diagrammatically in dotted lines. Motor 10 has a rotating shaft 12 which is preferably provided at its free end with a worm 14. Worm 14 drivingly engages the worm gear 16 of my shaft positioner. It is to be understood, however, that a bevel gear arrangement or any other satisfactory driving mechanism for the present magnetic fluid brake may be employed without departing from the spirit of the invention. Secured to the inner circumference of worm gear 16 preferably by a press-fit is a dual-drive annular gear 18 which rotates simultaneously with the worm gear 16. Of course, my invention contemplates the use of two identical brake mechanisms A and B mounted in brake housings 20 and 22 respectively, said housings being positioned transverse to main housing 24 (see Fig. 1) and since both brakes A and B are identical it is deemed sufficient for the purposes of this disclosure to merely elaborate on brake A, it being understood that the structure and the function of the elements set forth in brake A are the same as for brake B. Three planetary gear pinions 26, 28 and 30 respectively engage the annular gear 18. The aforesaid planetary gear pinions are spaced along the circumference of annular gear 18 by means of a carrier member 32 having radial arms 34. Each radial arm carries a shaft 36 upon which the planetary gear pinions are mounted, although only one shaft is shown herein. Thus, the planetary gear pinions 26, 28 and 30 respectively are free to rotate on their own individual shafts 36. It is possible to carry out the present invention utilizing only one planetary gear, however I use three planetary gears herein due to design considerations. Also located within the confines of annular gear 18 is a sun gear 38 which is positioned between the planetary gear pinions in such a manner that it meshes with all three planetary gear pinions 26, 28 and 30 respectively. Carrier member 32 is provided with a hollow stub shaft 40 and a hollow bevel gear 42. Bevel gear 42 is meshed with ring gear 44, said ring gear having the bi-directional output shaft 46 fixed thereto to form an output shaft assembly. The aforesaid output shaft assembly is mounted in ball bearing arrangements 48 and 50 respectively however any other suitable bearing structure may be used for the output shaft assembly. Sun gear 38 is mounted on central shaft 52 which additionally supports annular gear 18. Another identical central shaft 52 as seen in Fig. 2 is positioned in aligned opposite relationship in brake B. Thus, annular gear 18 is adequately supported by central shafts 52, and shafts 52 freely rotate upon the activation of motor 10. Central shaft 52 is provided with a transverse groove 54 at the free end thereof which is adapted to receive a tongue 56 on one end of clutch shaft 58. The aforesaid tongue and groove form a keying or feathering arrangement, thus permitting the brakes to be driven by the main power source yet allowing the entire brake mechanism to be replaced or increased in number by adding brakes in gangs thereby changing the output characteristics of the present brake mechanism, for example by increasing the torque or changing the brake response curve.

Referring now more particularly to the brake mechanism, the brake shaft 58 supports a brake disc 60 which is adapted to rotate between pole pieces 62 and 64 located in opposed relationship on opposite sides of the brake disc 60. The entire assembly of the brake mechanism is housed within the space defined by cylindrical coil 66. Coil 66 is connected to a power source so that current therefrom may traverse the windings of coil 66. At one end of coil 66 there is a damping winding 68 which is separated from coil 66 by spacer member 70. A mixture of iron powder and oil 72 is located in the cross-shaped space or chamber 74 between pole pieces 62 and 64. It is to be understood that a dry mixture of iron powder may also be used satisfactorily in the present construction. In addition, it is possible to stop the movements of the brake disc 60 without any substance being present in chamber 74. In that case the electro-magnetic lines of force created by the current applied to coil 66 is sufficient to "lock" brake disc 60 against rotation. A vent hole 76 communicates from space 74 to the outside atmosphere.

The operation of my shaft positioner embodying the present invention is as follows: Shaft 12 and worm 14 are rotated by a motor 10 which in turn causes the worm gear 16 and associated dual-drive annular gear to rotate thereby rotating planetary gear pinions 26, 28 and 30 about their own axis and on their own shafts. Since the planetary gear pinions are interengaged with sun gear 38, the sun gear 38, shaft 52, and brake disc 60 are operatively rotated by motor 10. The bevel gear 42 and carrier member 32 are not free to move since both bevel gears 42 of brake A and B respectively are coupled to ring gear 44 and exhibit forces which are equal and opposite to each other. Thus, the output shaft 46 remains stationary when clutch shaft 58 and brake disc 60 are rotated indirectly by the motor 10 through the ring gear, dual-drive annular gear, planetary gear pinions and sun gear. However, if current is applied to brake A through coil 66 the pole pieces 62 and 64 become magnetized to a value depending upon the amount of current passed through the iron powder mixture thus causing the mixture of iron powder and oil to solidify which in turn causes the clutch shaft 58, brake disc 60 and sun gear 38 to stop rotating. It should be noted that the speed of the output shaft is dependent upon the current applied to the brake and the mass of the mechanism to be rotated. Thus, it is possible to get either a rapidly responsive reversing action or a slowly responsive reversing action depending upon the results desired. Since the sun gear cannot rotate in this condition the planetary gear pinions supporting carrier member 32 rotate as a unit along the teeth of annular gear 18, the axis of rotation being the center of carrier member 32. The rotation of carrier member 32 causes the attached bevel gear 42 also to rotate which in turn rotates the output shaft 46 in one direction. The force acting on bevel gear 42 of brake A is greater than the force acting on bevel gear 42 of brake B. Accordingly the bevel gear 42 of brake A will rotate the ring gear 44 while the bevel gear of brake B will be carried by the force acting on brake A yet it will rotate in the opposite direction as the bevel gear of brake A. In order to cause the output shaft 46 to rotate in the opposite direction current is applied to brake B in the same manner that it is applied to brake A, thus causing a reversal of rotation of the output shaft assembly. Although a magnetic fluid type brake is shown herein it is possible to use other types of arresting or limiting type devices, for example, the well-known mechanical brake.

While I have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What I claim is:

1. A shaft positioning device comprising a driving means, an annular gear operatively connected to said driving means, a pair of opposed carrier members each having an integral hollow shaft and hollow gear, a planetary gear set on each of said carrier members arranged within the circumference of said annular gear and meshing therewith, at least one sun gear meshing with each set of planetary gears, each of said sun gears having an axial shaft projecting through said hollow shaft and hollow gear, an output shaft assembly being provided with a ring gear which is in engagement with both of said hollow gears, a pair of opposed magnetic brakes each comprising a brake shaft, means on said brake shaft for removably securing said brake shaft to said axial shaft, each brake being provided with a pair of pole pieces defining a chamber therebetween, a brake plate on each of said brake shafts and in each of said chambers, an iron powder mixture in each of said chambers, a coil surrounding each of said opposed brakes and a source of current connected to each of said coils whereby when said current is applied to one of said coils one of said hollow gears drives said ring gear and said output shaft assembly is caused to rotate in one direction and when said current is applied to the other of said coils the other of said hollow gears drives said ring gear and said output shaft assembly is caused to rotate in the other direction.

2. A shaft positioning device comprising a driving means, an annular gear operatively connected to said driving means, a pair of opposed carrier members each having an integral hollow shaft and hollow bevel gear, a planetary gear set on each of said carrier members arranged within the circumference of said annular gear and meshing therewith, at least one sun gear meshing with each set of planetary gears, each of said sun gears having an axial shaft projecting through said hollow shaft and hollow gear and extending substantially at right angles to said annular gear, an output shaft assembly being provided with a ring gear which is in engagement with both of said hollow bevel gears, a pair of brake mechanisms, means on each of said brake mechanisms for removably securing each brake mechanism to its corresponding axial shaft, and each brake mechanism being adapted to cause said shaft positioning device to rotate in a predetermined direction whereby one of said hollow bevel gears is in driving engagement with said ring gear.

3. A shaft positioning device comprising a driving means, an annular gear operatively connected to said driving means, a pair of opposed carrier members each having an integral hollow shaft and hollow bevel gear, a planetary gear set on each of said carrier members arranged within the circumference of said ring gear and meshing therewith, at least one sun gear meshing with each set of planetary gears, each of said sun gears having an axial shaft projecting through said hollow shaft and hollow gear, an output shaft assembly being provided with a ring gear which is in engagement with both of said hollow bevel gears, a pair of opposed magnetic brakes each comprising a brake shaft, means on said brake shaft for removably securing said brake shaft to said axial shaft, each brake being provided with a pair of pole pieces defining a chamber therebetween, a brake plate on each of said brake shafts and in each of said chambers, a coil surrounding each of said opposed brakes and a source of current connected to each of said coils whereby when said current is applied to one of said coils one of said hollow gears drives said ring gear and said output shaft assembly is caused to rotate in one direction and when said current is applied to the other of said coils the other of said hollow gears drives said ring gear and said output shaft assembly is caused to rotate in the other direction.

4. A shaft positioning device comprising a driving means, a worm gear operatively connected to said driving means, an annular gear, said worm gear drivingly engaging said annular gear, a pair of opposed carrier members each having an integral hollow shaft and hollow gear, a planetary gear set on each of said carrier members arranged within the circumference of said ring gear and meshing therewith, at least one sun gear meshing with each set of planetary gears, each of said sun gears having an axial shaft projecting through said hollow shaft and hollow gear, an output shaft assembly being provided with a ring gear which is in engagement with both of said hollow gears, a pair of opposed magnetic brakes each comprising a brake shaft, means on said brake shaft for removably securing said brake shaft to said axial shaft, each brake being provided with a pair of pole pieces defining a chamber therebetween, a brake plate on each of said brake shafts and in each of said chambers, an iron powder mixture in each of said chambers, a coil surrounding each of said opposed brakes and a source of current connected to each of said coils whereby when said current is applied to one of said coils one of said hollow gears drives said ring gear and said output shaft assembly is caused to rotate in one direction and when said current is applied to the other of said coils the other of said hollow gears drives said ring gear and said output shaft assembly is caused to rotate in the other direction.

5. A shaft positioning device comprising a driving means, an annular gear operatively connected to said driving means, a pair of carrier members each having a hollow shaft and a hollow gear, at least one planetary gear on each of said carrier members arranged within the circumference of said annular gear and meshing therewith, at least one sun gear within the circumference of said annular gear meshing with at least one planetary gear, said sun gear having an axial shaft projecting through said hollow shaft and said hollow gear, an output shaft assembly being provided with a gear which is in engagement with both said hollow gears, a pair of brake mechanisms, and means on each of said brake mechanisms for removably securing each brake mechanism to its corresponding axial shaft, each brake mechanism being adapted to cause said shaft positioning device to rotate in a predetermined direction.

References Cited in the file of this patent
UNITED STATES PATENTS

| | | |
|---|---|---|
| 983,452 | Kirk | Feb. 7, 1911 |
| 1,234,622 | Burns | July 24, 1917 |
| 1,724,711 | Hollick | Aug. 13, 1929 |
| 2,441,606 | Trofimov | May 18, 1948 |
| 2,575,360 | Rabinow | Nov. 20, 1951 |
| 2,617,507 | Feiertag | Nov. 11, 1952 |
| 2,649,935 | Tack | Aug. 25, 1953 |
| 2,695,675 | Frye | Nov. 30, 1954 |
| 2,725,133 | Winther | Nov. 29, 1955 |
| 2,758,484 | Keltner | Aug. 14, 1956 |